United States Patent
Chern

(10) Patent No.: US 8,353,019 B2
(45) Date of Patent: Jan. 8, 2013

(54) SECURITY TOKEN DESTINED FOR MULTIPLE OR GROUP OF SERVICE PROVIDERS

(75) Inventor: Wei-Jhy Chern, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/732,543

(22) Filed: Mar. 26, 2010

(65) Prior Publication Data

US 2011/0239283 A1 Sep. 29, 2011

(51) Int. Cl.
*G06F 7/04* (2006.01)

(52) U.S. Cl. .......................................... 726/6; 713/172

(58) Field of Classification Search .................. 726/5, 6, 726/9; 713/168, 172
See application file for complete search history.

(56) References Cited

U.S. PATENT DOCUMENTS

| | | | |
|---|---|---|---|
| 4,227,253 A | 10/1980 | Ehrsam et al. | |
| 5,329,619 A | 7/1994 | Page et al. | |
| 5,729,710 A | 3/1998 | Magee et al. | |
| 5,771,383 A | 6/1998 | Magee et al. | |
| 5,812,768 A | 9/1998 | Page et al. | |
| 5,941,947 A | 8/1999 | Brown et al. | |
| 5,974,409 A | 10/1999 | Sanu et al. | |
| 6,587,867 B1 | 7/2003 | Miller et al. | |
| 6,615,258 B1 | 9/2003 | Barry et al. | |
| 6,898,711 B1 | 5/2005 | Bauman et al. | |
| 7,032,067 B2 | 4/2006 | Massard | |
| 7,197,765 B2 | 3/2007 | Chan et al. | |
| 7,228,417 B2 | 6/2007 | Roskind | |
| 7,310,684 B2 | 12/2007 | Patrick et al. | |
| 7,340,438 B2 | 3/2008 | Nordman et al. | |
| 7,346,923 B2 | 3/2008 | Atkins et al. | |
| 7,356,694 B2 | 4/2008 | Mayo et al. | |
| 7,392,390 B2 | 6/2008 | Newcombe | |
| 7,441,265 B2 | 10/2008 | Staamann et al. | |
| 7,480,806 B2 | 1/2009 | Grawrock | |
| 2003/0126441 A1* | 7/2003 | Laux et al. | 713/168 |
| 2006/0123234 A1 | 6/2006 | Schmidt et al. | |
| 2007/0022196 A1* | 1/2007 | Agrawal | 709/225 |
| 2007/0130463 A1* | 6/2007 | Law et al. | 713/168 |
| 2007/0169181 A1 | 7/2007 | Roskind | |
| 2007/0255951 A1 | 11/2007 | Grynberg | |
| 2008/0313707 A1* | 12/2008 | Jain et al. | 726/2 |
| 2009/0320118 A1* | 12/2009 | Muller et al. | 726/9 |

\* cited by examiner

*Primary Examiner* — Samson Lemma
(74) *Attorney, Agent, or Firm* — Fitzpatrick, Cella, Harper & Scinto

(57) ABSTRACT

An authentication server generates a security token to be used by a client for accessing multiple service providers by obtaining a secret key for each specified service provider, generating a saltbase, generating a salt for each service providers using the saltbase, the secret key, and a hashing algorithm, generating a session key that includes the salt, assigning an order to each of the generated salts, and arranging the salts based on the orders, generating a presalt for each provider using the salt for each previous provider, generating a postsalt for each of the specified service providers using the salt for each following provider, generating a blob for each of the specified service providers using the saltbase, the respective presalt, and the respective postsalt, inserting the generated blobs for the specified service providers in the security token, and providing the generated security token to the client workstation.

11 Claims, 8 Drawing Sheets

SECURITY TOKEN DESTINED FOR MULTIPLE OR GROUP OF SERVICE PROVIDERS

FIELD

The present disclosure relates to a technique for generating a single session key that can be included in a single security token to be used by multiple different service providers.

BACKGROUND

In the field of secure communications for obtaining services over a network, the use of security tokens in communications between an identity provider and a service provider is a known concept. One type of known system is Security Assertion Markup Language (SAML), which is an XML-based standard for exchanging authorization and authentication data between security domains (i.e., between an identity provider (a producer of assertions) and a service provider (a consumer of assertions)). Another type of known system utilizes Kerberos security tokens. In each of these conventional systems, one token is normally created for one service provider/Kerberos service when requested from an identity provider or Key Distribution Center (KDC). The token is normally protected by a signature and/or encryption using a pre-established trust between each service provider/Kerberos service and the identify provider/KDC. This means that the security token can only be consumed by one service provider/Kerberos service.

In a work flow scenario that requires a user to visit multiple service providers, multiple security tokens have to be acquired for each service provider. The multiple tokens have to either be requested by the user, or through some type of delegation and/or federation. The difference between each of these multiple tokens may be just the signature/encryption of each security token, while the Assertion (authorization) part might be the same between these security tokens.

A system to address the foregoing has been proposed in U.S. Patent Publication No. 2003/0126441 (Laux). In the system proposed by Laux, when a user logs-in to access a first service, authentication information for the first service, along with authentication information for a plurality of related services, is provided in a token to the user. Thus, when the user provides the security token to access the first service, if the user also wants to access other related services, the user does not need to provide a separate security token for the related service since it already includes the authentication information for the related services. One problem with this technique is that the security token includes credentials for related services that the user did not request and that the user may not want to use. That is, the user merely requests access to one service, and the system of Laux automatically includes related services under the assumption that the user may want to access the additional related services. While this may address an issue with requiring multiple accesses to the authentication source for separate tokens in order to access multiple services, the system is nonetheless inherently inefficient because it needlessly includes unwanted and unnecessary information.

In generating a security token for conventional systems, typically, the token includes a session key (or information necessary to derive the session key) specific for a particular service provider. In generating the session key (or information to derive the key) to be included in the token, the authentication source generally knows the secret key for each service provider on the network, and uses the secret key to generate the session key (or information to derive the session key). Upon receiving the token, the service provider can retrieve the session key from the token, or can utilize the information in the token to derive the session key so that the device can access the service provider. Thus, a one-to-one token-to-service provider approach is generally used. This also provides for certain inefficiencies because it requires the generation of multiple different session keys for each service provider, which again, results in needless and excessive information being included in the token.

SUMMARY

The present disclosure provides a unique way of generating a security token to be used by multiple different service providers so that each service provider can restore a session key generated from information included in the token. That is, the token includes a blob of information for each service provider, where each blob includes information of other service providers that the service provider itself can use to restore the session key. The technique used is as follows.

The secret key for each service provider is known by an authentication server. (e.g., Secret key for each service: $K_1$, $K_2$, ... $K_n$). The authentication server generates a saltbase (e.g., Saltbase: base salt generated by Security Token Service). The authentication server then generates a Salt for each service provider (i). The $Salt_i$ for each service provider is generated using the Saltbase and the secret key ($K_i$) of the respective service provider and a hashing algorithm (e.g., $Salt_i=H(Saltbase+H(K_i))$). This process is performed for each service provider so that, for example, if three service providers were to be included in the same token, three Salts ($Salt_1$, $Salt_2$, and $Salt_3$) would be generated.

Once the Salt for each service provider has been generated, a single session key can be generated to include the Salt for each service provider (e.g., $SessionKey=H(Salt_1+Salt_2+ ... +Salt_n)$). Thus, the session key is a unique, single key that can be used by multiple service providers and a separate session key for each service provider does not need to be generated. Each service provider, however, should to be able to utilize the session key and therefore, the following process is performed.

For each service provider (i), a $SaltPre_i$ and a $SaltPost_i$ is generated, and this information is used for each service provider to be able to restore the session key. The $SaltPre_i$ includes the Salt for each service provider previous to the service provider in question (e.g., $SaltPre_i=Salt_1+Salt_2+ Salt_{i-1}$). Thus, for each service provider, SaltPre would be as follows: $SaltPre_1=0$, $SaltPre_2=Salt_1$, $SaltPre_3=Salt_1+Salt_2$. Similarly, the $SaltPost_i$ includes the Salt for each service provider following the service provider in question (e.g., $SaltPost_i=Salt_{i+1}+ ... Salt_n$). Thus, for each service provider, SaltPost would be as follows: $SaltPost_1=Salt_2+Salt_3$, $SaltPost_2=Salt_3$, $SaltPost_3=0$. The SaltPre and SaltPost values are utilized for each service provider to restore the session key after calculating its own Salt value.

Finally, a $Blob_i$ is generated for each respective service provider to be included in the token. The Blob includes the Saltbase, along with the respective SaltPre and SaltPost for each service provider (e.g., $Blob_i=Saltbase, SaltPre_i, SaltPost_i$). The information contained in the Blob may optionally be encrypted with the secret key ($K_i$) of the respective service provider (e.g., $Blob_i=EK_i$ (Saltbase, $SaltPre_i$, $SaltPost_i$)). Each Blob is then included in the token.

The foregoing process performed by the authentication server may be summarized as follows:

Secret key for each service: $K_1, K_2, \ldots K_n$
Saltbase: base salt generated by STS
$Salt_i = H(Saltbase + H(K_i))$
$SessionKey = H(Salt_1 + Salt_2 + \ldots + Salt_n)$
$SaltPre_i = Salt_1 + Salt_2 + Salt_{i-1}$
$SaltPost_i = Salt_{i+1} + \ldots + Salt_n$
$Blob_i = Saltbase, SaltPre_i, SaltPost_i$ or $Blob_i = EK_i(Saltbase, SaltPre_i, SaltPost_i)$ The token is then provided to the client requesting access to the specified services. When the client attempts to access a service, it provides the token to the service provider. The service provider then attempts to restore the session key by obtaining its respective Blob from the token and performs the necessary processing to restore the session key and validate the token. As a result, a single session key can be generated and used in a security token by multiple different service providers, thereby eliminating the need to generate separate session keys and correspondingly, separate tokens for each service provider.

Thus, in one embodiment of the claims, the disclosure relates to a method of using a security token generated by an authentication server to access a plurality of service providers in a system that includes the authentication server, the plurality of service providers, and at least one client workstation. In this method, a client workstation, specifies a plurality of service providers to be accessed by the client, and submits a request to an authentication server for a security token to access each of the specified service providers. Thus, the security token is generated based on the specific services requested by the user.

The authentication server generates the requested security token in the following manner. First, a secret key for each of the specified service providers is obtained. Then, a saltbase is generated, and a salt is generated for each of the specified service providers, where for each service provider, the authentication server generates the respective salt using the saltbase, the secret key of the respective service provider, and a hashing algorithm. Next, a session key that includes the salt for each service provider is generated. For each of the generated salts, an order is assigned and the salts are arranged in accordance with their respective orders.

A presalt is generated for each of the specified service providers, where for each service provider, the authentication server generates the respective presalt using the salt for each service provider previous to the instant service provider, as determined by the respective orders of the salts. Similarly, a postsalt is generated for each of the specified service providers, where for each service provider, the authentication server generates the respective postsalt using the salt for each service provider following the instant service provider, as determined by the respective orders of the salts.

Finally, a blob is generated for each of the specified service providers, where for each service provider, the authentication server generates the respective blob using the saltbase, the respective presalt, and the respective postsalt, and the generated blobs for the specified service providers are inserted in the security token. As a result, the security token, which can be used for multiple service providers, is obtained and provided to the client.

The client can then access each of the specified service providers by providing the received security token to each of the specified service providers. Each specified service provider validates the received security token, and in response to a determination that the security token is valid, the service provider provides a service to the client. Here, the service provider validates the received security token by obtaining its respective blob from the security token, calculating its own Salt value using the Saltbase, and then restoring the session key using the calculated Salt, along with the SaltPre and SaltPost values included in the token, and validates the security. Thus, each service provider can readily derive and use the same session key using the information contained in the token.

This brief summary has been provided so that the nature of this disclosure may be understood quickly. A more complete understanding can be obtained by reference to the following detailed description and to the attached drawings.

DETAILED DESCRIPTION

The following description will be made with reference to the accompanying drawings. Briefly, the description is made for a user of a client machine wanting to access multiple services provided by different service providers, such as the networked environment shown in FIG. 1. Here, the user may, for example, want to submit a job for processing photographs to a photo shop, submit a print job to a print shop, and/or conduct a financial transaction with a bank. To accomplish the foregoing, the user's (client) computer submits a request to an authentication authority (token provider) for a security token that can be used to access each of the foregoing service providers (i.e., the photo shop, print shop and bank). The token provider performs various process steps (to be described in detail below) to generate a security token that includes the necessary credentials for accessing each of the requested service providers and provides the token to the client. The user then accesses each service provider and provides the security token to each service provider, whereby the service providers perform various operations (to be described in detail below) to validate the token. Once the token has been validated, the requested service is provided to the user.

Figure 1:
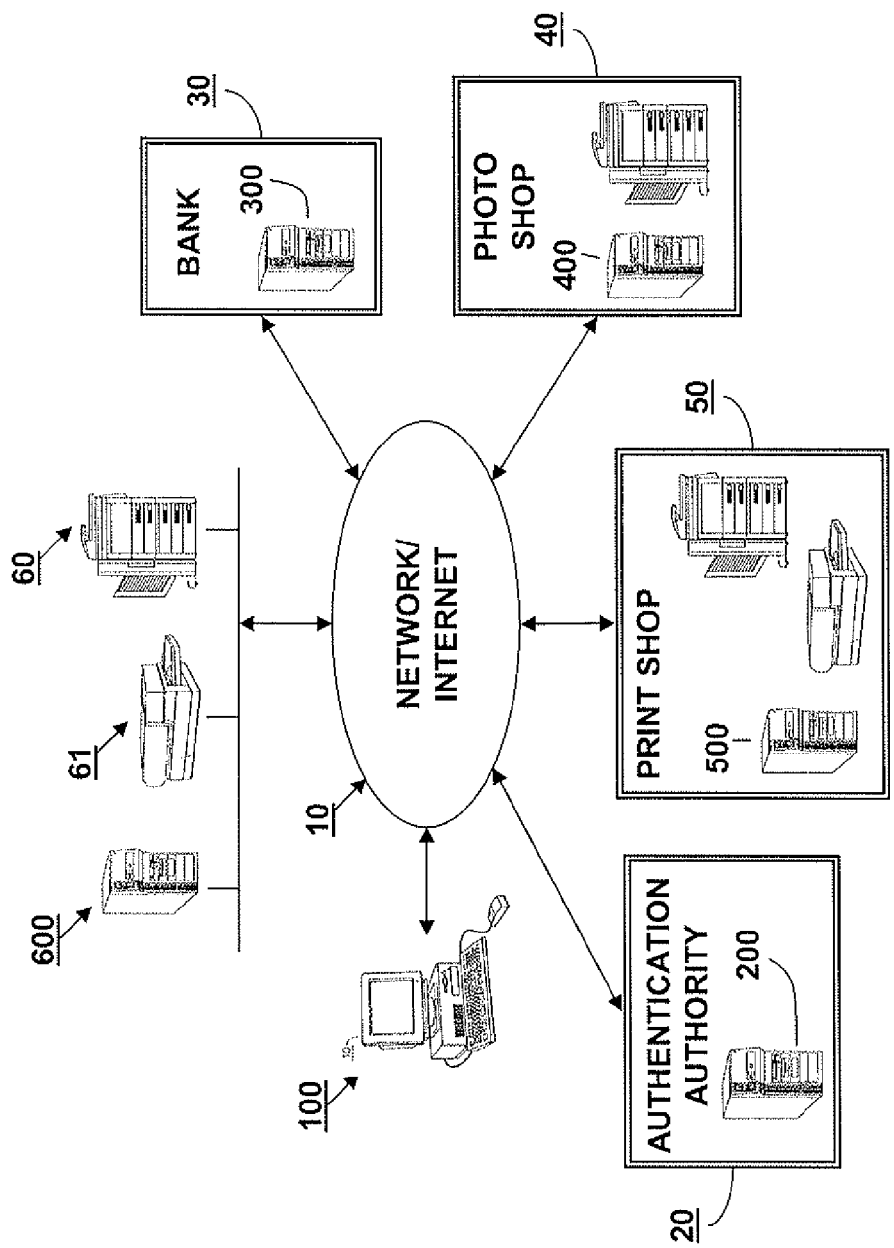
FIG. 1 depicts an example of a networked environment in which the invention may be implemented.

Referring now to FIG. 1, depicted therein is an example networked environment in which the process of the claims may be implemented. As seen in FIG. 1, the networked environment may include a client 100, authentication authority 20, bank 30, photo shop 40 and print shop 50, each of which are connected via a network 10. Network 10 may be a local area network (LAN), wide area network (WAN), the Internet, or any type of network. Client 100 is preferably a personal computer (PC), but may be any type of computing device, including a laptop computer, wireless device such as a personal digital assistant (PDA), mobile telephone, etc. Each of bank 30, photo shop 40 and print shop 50 are preferably business entities, and may have entered into an arrangement to participate in the networked environment and to provide some type of service that may be desired by users of the network. For instance, bank 30 is preferably a financial institution and may provide online banking transactions for its customers. To provide better security of such transactions, the use of a security token process described herein may be implemented by bank 30. In a similar manner, photo shop 40 may be a business entity that provide various photographic imaging services such as generating and delivering hard copy printouts of photographs to its customers. To provide better security for such a service, photo shop 40 may implement the security token process described herein. Likewise, print ship 50 may provide a printing service whereby a customer may submit a print job for processing by the print shop. Again, utilizing a security token process described herein can provide better security of such a system.

As seen in FIG. 1, each of the foregoing service providers includes a server, such as server 300 for bank 30, server 400 for photo shop 40, and server 500 for print shop 50. Each of these servers may be similar in construction and as it relates to the disclosure, perform processes for receiving a security token from a client, validating the security token, and providing the requested service to the client. The internal structure and processes of the server will be discussed in more detail below.

FIG. 1 also depicts server 600, digital copy machine 60 and printer 61 connected to network 10. These devices may be connected to the same network 10 or via a sub-network as shown in FIG. 1. Each of server 600, printer 61 and copy machine 60 may also implement the security token process described herein in order to provide a service (e.g., data storage for server 600, printing for printer 61 or printing, scanning, or copying for copy machine 60) to client 100.

Authentication authority 20 (which may also be referred to hereinafter as a "token provider") is an authority that maintains security credentials on the network and that generates and issues security tokens. In particular, a client wanting to access a service from any one or more of the service providers on the network submits a request to authentication authority 20 for a security token. In the context described herein, the request includes multiple service providers, whereby the authentication authority generates a single security token that can then be submitted to each of the service providers to access the service. The authentication authority preferably includes at least one server, such as server 200. Server 200 preferably maintains secret keys of each service provider on the network, along with encryption keys and other security credentials. As will be described in more detail below, when server 200 receives the request for the security token from client 100, it performs various processes to generate the token and provide the token to the client.

As those skilled in the art readily understand, the service providers depicted in FIG. 1 are mere examples. The disclosure is not limited to only those service providers, client, network, and other devices shown in FIG. 1 and it is readily understood that additional service providers and devices may also form part of the networked environment.

Figure 2:
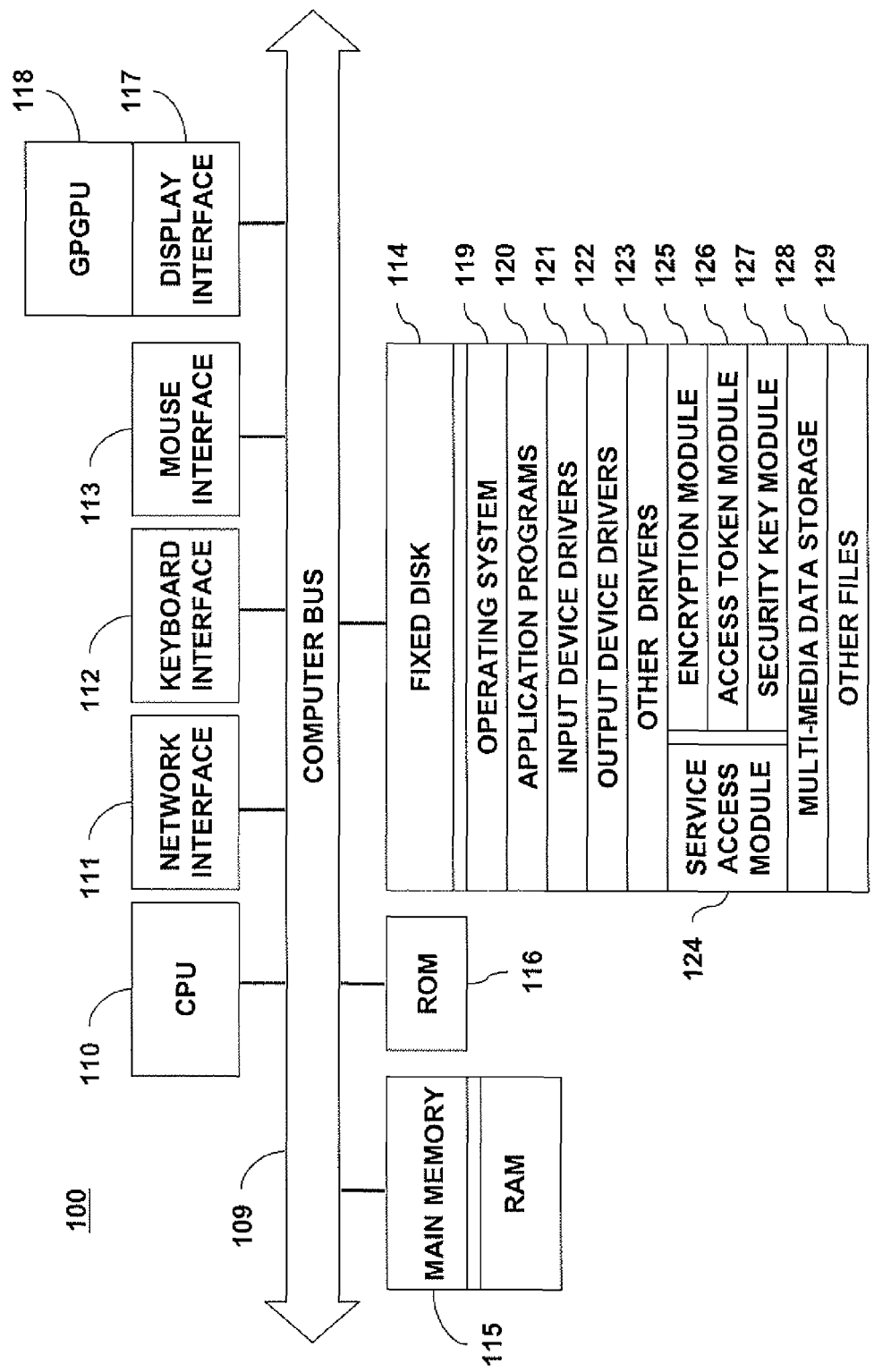
FIG. 2 depicts an example of internal architecture of a client computer which may be used to implement the invention.

Referring now to FIG. 2, depicted therein is a diagram of the internal architecture/structure of a computing device, such as client computer 100. As shown in FIG. 2, computer 100 includes central processing unit (CPU) 110 which interfaces with computer bus 109. Also interfacing with computer bus 109 are fixed disk 114 (e.g., a hard disk or other non-volatile storage medium), network interface 111 for accessing other devices across a network, keyboard interface 112, mouse interface 113, random access memory (RAM) 115 for use as a main run-time transient memory, read only memory (ROM) 116, and display interface 117 for a display screen or other output.

GPGPU 118 is a general-purpose graphics processing unit (GPU), a parallel-processing device that is ordinarily designed to render computer graphics, and that also performs calculations for non-graphics data traditionally handled by a CPU. GPGPU 118 may have a SIMD architecture. SIMD (single instruction-multiple data stream), is a type of parallel computing architecture that allows a single computer instruction to perform an identical action simultaneously on multiple pieces of data using multiple processing units.

RAM 115 interfaces with computer bus 109 so as to provide information stored in RAM 115 to CPU 110 during execution of the instructions in software programs, such as an operating system, application programs, and device drivers. More specifically, CPU 110 first loads computer-executable process steps from fixed disk 114, or another storage device into a region of RAM 115. CPU 110 can then execute the stored process steps from RAM 115 in order to execute the loaded computer-executable process steps. Data or other information can be stored in RAM 115 so that the data can be accessed by CPU 110 during the execution of the computer-executable software programs, to the extent that such software programs have a need to access and/or modify the data.

As also shown in FIG. 2, fixed disk 114 contains computer-executable process steps for operating system 119, and application programs 120. Fixed disk 114 also contains computer-executable process steps for device drivers, such as input device drivers 121, output device drivers 122, and other device drivers 123, as well as multi-media data storage 128 and other files 129.

Service access module 124 comprises computer-executable process steps for performing a process to access a service from a service provider, and generally comprises a number of sub-modules. More specifically, service access module 124 may include an encryption module 125, access token module 126 and security key module 127, each of which may be implemented for computer 100 to access a service from a service provider. As will be described in more detail below, when a user wants to access one or more service providers on the network to obtain a service, access token module 126 may initiate and transmit a request to authentication authority server 200 for a security token that can be used to access each of the service providers. The request may be encrypted by encryption module 125. Keys for the encryption or other security keys utilized in the service provider access process can be maintained by security key module 127.

The computer-executable process steps for service access module 124 may be configured as part of operating system 119, as part of an output device driver, such as a print processing driver if print processing is part of a requested service, or as a stand-alone application program. Service access module 124 may also be configured as a plug-in or dynamic link library (DLL) to the operating system, device driver or application program. In one example embodiment described herein, service access module 124 is incorporated directly into the operating system for computer 100. It can be appreciated that the present disclosure is not limited to these embodiments and that the disclosed modules may be used in other environments.

Figure 3:
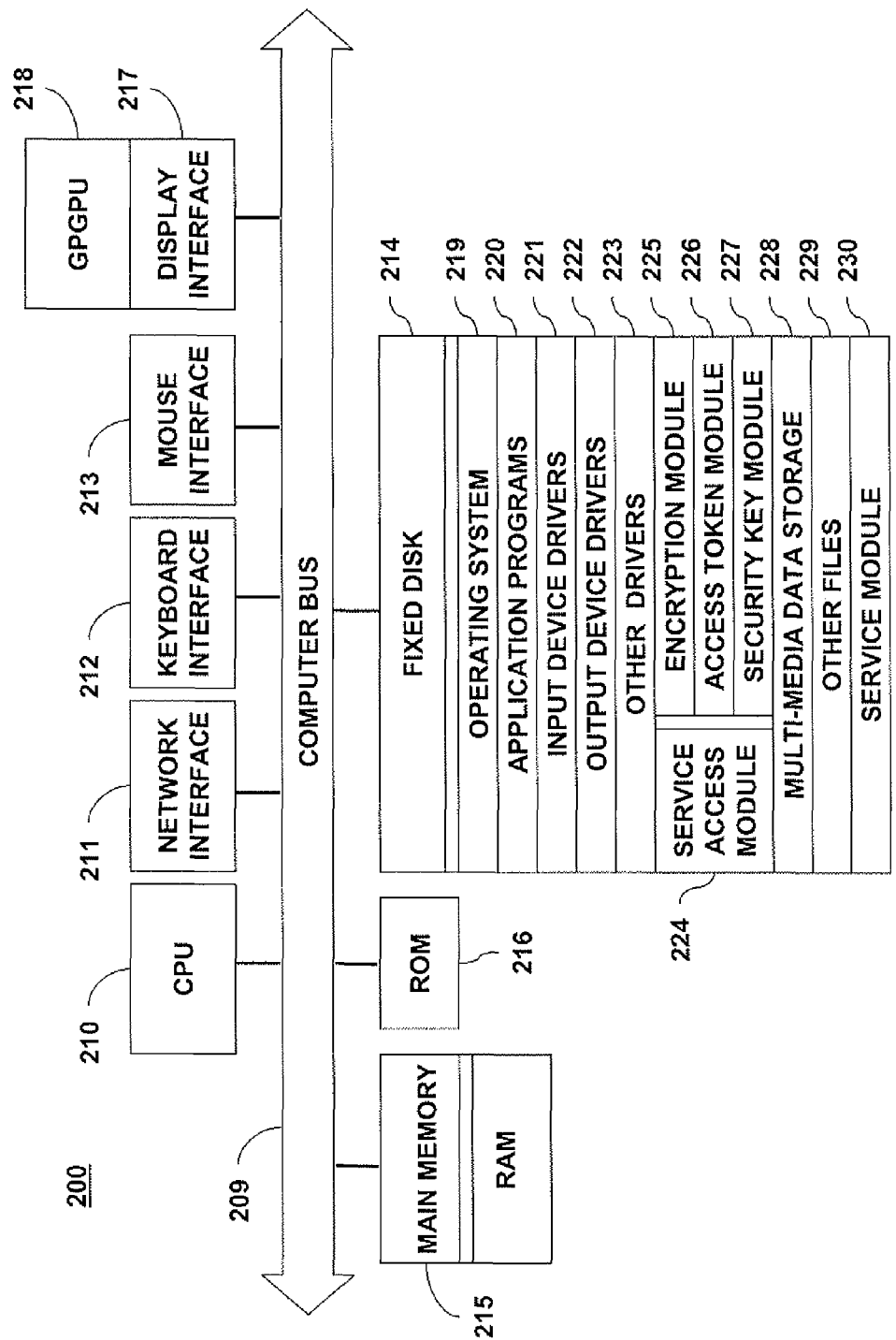
FIG. 3 depicts an example architecture of a server which may be used to implement the invention.

FIG. 3 depicts a diagram of the internal architecture/structure of a server computing device, such as any one of servers 200, 300, 400, 500 and 600. Here, it is noted that server 200, which is part of authentication authority 20, is somewhat different from the other servers in that it includes various software modules (to be described later with regard to FIG. 5) as part of service access module 224 for generating a security token to be provided to the client 100. That is, server 200 is a trusted authority that includes the requisite software modules for receiving a request for a security token from the client, generating the requested token, and providing the requested token to the client. On the other hand, servers 300, 400, 500 and 600 are part of a service provider that provide a service requested by the client after receiving a token from the client and validating the token. Thus, servers 300, 400, 500 and 600 include various software modules for validating the token (to be described later with regard to FIGS. 8 and 9), but not necessarily the modules for generating the token. Of course, if server 200 also provides a service, then it may also include the token validation modules. Accordingly, while a common internal architecture for each of the servers is depicted in FIG. 3, it can be understood that some software modules included in server 200 may be omitted from the other servers, while server 200 may omit service module 230 if server 200 does not also provide a service as a service provider.

Referring to FIG. 3, various components shown therein that are similar to that of the architecture shown and described above with regard to FIG. 2 have like reference numerals. Thus, computer bus 209, CPU 210, network interface 211, keyboard interface 212, mouse interface 213, memory/RAM 215, ROM 216, display interface 217 and GPGPU 218 are similar to the respective components of FIG. 2 and a further description thereof is being omitted here for brevity.

Figure 5:
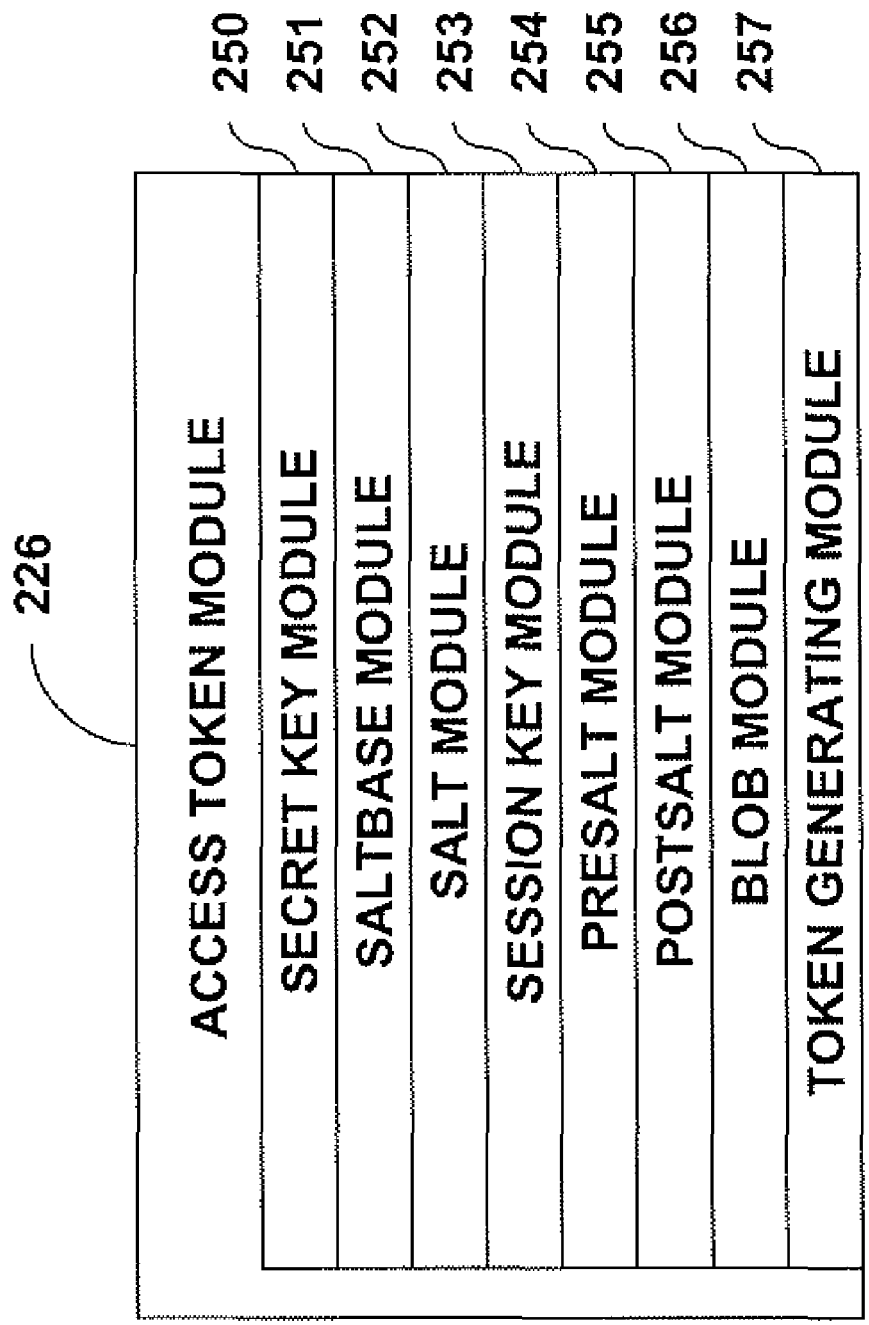
FIG. 5 depicts various modules which may be utilized to implement the invention.
Figure 6:
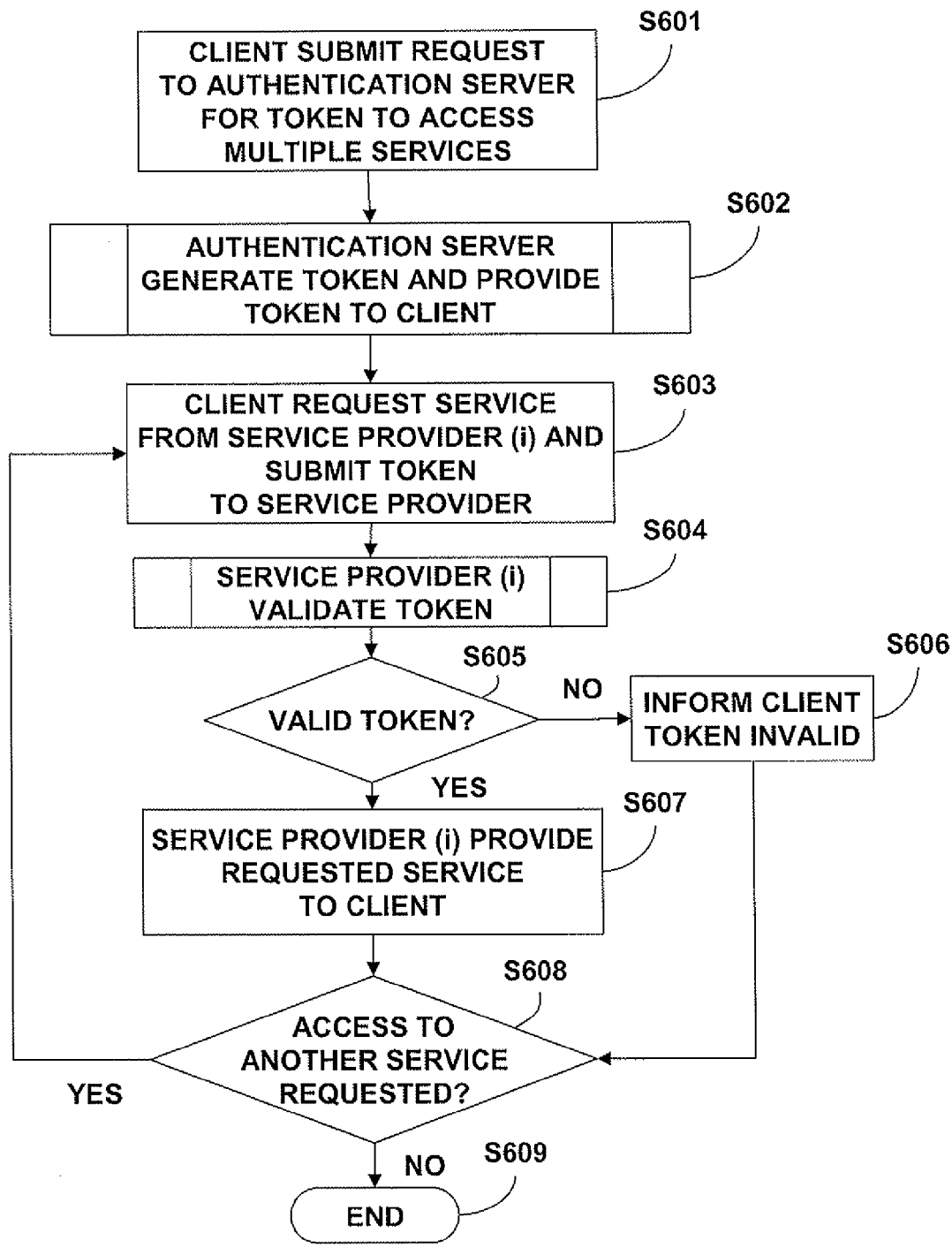
FIG. 6 is a flowchart of process steps of a client to access a service provided by a service provider.

Server 200 of FIG. 3 is also seen to include fixed disk 214, which contains computer-executable code for operating system 219, and application programs 220. Operating system 219 is a server-type operating system, such as Novell, Windows NT, etc. Application programs may include various types of server software applications, such as electronic mail, document and image storage programs, multi-media applications, etc. Fixed disk 214 also contains computer-executable code for various device drivers, such as input device drivers 221, output device drivers 222, and other device drivers 223, as well as multi-media data storage 228 and other files 229. Fixed disk 214 is also seen to include service access module 224, which may be comprised of encryption module 225, access token module 226 and security key module 227. Access token module 226 includes various modules as seen in FIG. 5 for performing a token generation and/or validation process. Here, it is noted that the modules of FIG. 5 may include executable code for 1) generating a security token, 2) validating a security token, or 3) both generating and validating a security token. Specifically, authentication authority server 200 includes code for generating a security token using the modules of FIG. 5 which include the requisite code for generating the token. If server 200 also provides a service, these same modules may also include code for validating a security token. As for servers 300-600, since they are primarily service provider servers, the modules of FIG. 5 included therein may merely comprise code for validating the security token, but not code for generating the security token. The process steps for generating the token and validating the token will be described in more detail below with regard to FIGS. 6 to 9.

Encryption module 225 provides encryption capabilities, such as encrypting/decrypting the security token and other communications. No particular type of encryption is required and virtually any known type of encryption could be implemented. Preferably, however, a hashing function is provided, along with functionality of a PKI (Public Key Infrastructure).

Security key module 227 provides functionality relating to various security keys. For example, the secret key of each service provider may be stored by security key module so that, when a security token is requested, the secret keys of each service provider included in the request can be obtained and used as part of the security token generation process. Service module 230 is for providing a requested service to the client upon request. Specifically, when the client wants to access a service provided by any one or more of the service providers, service module 230 may comprise code for executing the requested service.

Figure 4:
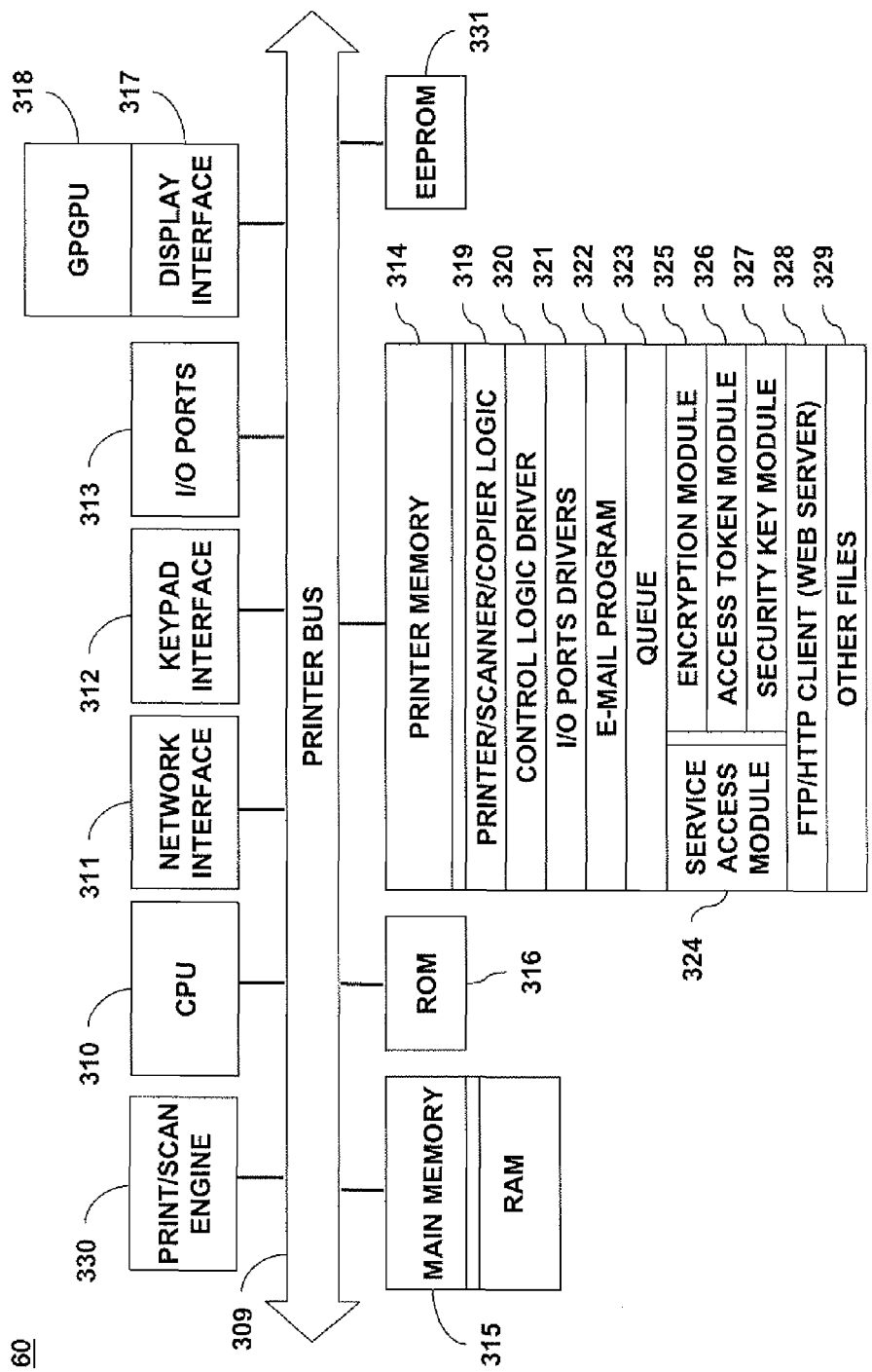
FIG. 4 depicts an example internal architecture of a printing device which may be used to implement the invention.

FIG. 4 depicts an example internal architecture of a printing device, such as printer 61 or digital copy machine 60. Here, it is noted that printer 61 may provide a printing service that can be requested by client 100 using a security token. Similarly, copier 60 may provide a scanning service, printing service, and/or copying service that can be requested by client 100 using the a security token. Thus, rather than requesting a service from a server, such as servers 300-600, the client may submit a service access request to either one of printer 61 and copier 60. As such, printer 61 and copier 60 are seen to include service access module 324, along with encryption module 325, access token module 326 and security key module 327. In the context of providing a service by printer 61 or copier 60, these would essentially be the same as the corresponding modules in the server of FIG. 3.

Copier 60 is seen to include a central processing unit (CPU) 310, such as a programmable microprocessor which is interfaced to printer bus 309. Also coupled to printer bus 309 are printer/scan engine 330 of copier 60, I/O ports 313 which is used to communicate with various input/output devices of copier 60 (not shown), network interface 311, which is utilized to interface copier 60 to network 10, keypad interface 312 and display interface 317, along with GPGPU 318.

Also coupled to printer bus 309 are EEPROM 331, for containing non-volatile program instructions, main memory (RAM) 315, printer memory 314 and read-only memory (ROM) 316. RAM 370 interfaces to printer bus 309 to provide CPU 310 with access to memory storage, thereby acting as the main run-time memory for CPU 310. In particular, when executing stored program instruction sequences, CPU 310 loads those instruction sequences from printer memory 314 (or other memory media) into RAM 315 and executes those stored program instruction sequences out of RAM 315. ROM 316 stores invariant instruction sequences, such as start-up instruction sequences for CPU 310 or BIOS sequences for the operation of various peripheral devices of copier 60 (not shown).

Printer memory 311 is one example of a computer-readable medium that stores program instruction sequences executable by CPU 310, and is seen to constitute printer/scanner/copier logic 319 for controlling print/scan engine 330, control logic driver 320, I/O port drivers 321, e-mail program 322, and other files 329. Printer/scanner/copier logic 319 and control logic driver 320 are utilized to control and drive the print/scan engine 330 of copier 60 so as to print an image according to image data received by copier 60, preferably over network 10. I/O port drivers 331 are utilized to drive the input and output devices (not shown) connected through I/O ports 313.

Other files 357 contain other files and/or programs for the operation of copier 60. E-mail program 322 is a typical e-mail program for enabling copier 60 to receive e-mail messages from network 10. Such e-mail messages may contain print job-related information. Printer memory 314 also includes FTP/HTTP client (Web server) 329 which provides the ability to retrieve files over the network through network interface 311. Also connected to printer bus 309 are display interface 317 and keypad interface 312.

A description will now be provided with regard to FIGS. 5 to 9 of various software modules and process steps executed thereby. Briefly, the software modules and process steps execute a process of client 100 submitting a request to authentication server 200 for a security token to access services provided by servers 300, 400, 500 and 600, server 200 generating the requested security token and providing the token to client 100, client 100 submitting a request for a respective service to each of servers 300, 400, 500 and 600, whereby the provided security token is included with the request, each of servers 300, 400, 500 and 600 validating the token, and once the token has been validated, providing the requested service to client 100. This overall process will now be described in detail with regard to FIG. 6.

To commence the process, in step S601, client 100 submits a request to authentication authority server 200 for a token to access multiple services. Here, the user may activate a service access program in client 100 to obtain services from bank 30, photo shop 40 and print shop 50. The user may select the services that they want to receive, whereby identification information of each service provider is obtained by the program. After selecting the various service providers and services, the user may select a button in a GUI (not shown) to obtain a security token. The program may then generate a request to be submitted to authentication authority server 200 to obtain the token, where the request includes the obtained identification information of each service provider. The request is then transmitted by the client 100 to server 200. To provide additional security, the request may be encrypted using, for example, a public key of a public/private keypair of the authentication authority server 200, or any other type of encryption (e.g., Secure Sockets Layer or "SSL") may be used instead.

Upon receiving the request for the security token from client 100, the authentication authority server 200 generates the requested security token (step S602). This process will be described in greater detail below with regard to FIGS. 5 and 7. However, for the present description, it is sufficient to say that server 200 generates a single token that can be used by client 100 to access each of the service providers identified in the request without the need for the client to have to obtain separate tokens for each provider. Moreover, the token only includes the information for those service providers specifically requested by client 100. Once server 200 has generated the requested token, the token is transmitted to client 100. To provide added security, the token may be encrypted using a public key of client 100, which may be part of a public/private keypair of client 100, or any other type of encryption (e.g., SLL) could be used to provide some added security. The client is also provided with a session key to be used between the client and each service provider (to be described in more detail below).

After the authentication authority server 200 transmits the security token to client 100, the client requests the service(s) from the service provider(s) (step S603). The request may be automatically generated and submitted by the service access program upon receipt of the security token, or the service access program may call for the user to manually initiate a service request. Additionally, multiple requests may be transmitted concurrently or consecutively, either via the automatic submission or the manual submission. In addition, one service may invoke another service. For example, a service request may be submitted to photo shop server 400 to have print processing of digital image files performed. This process may require a fee and as such, an application program that provides the photo printing service may automatically invoke a payment service that is submitted to bank server 300. In such a case, the service program of the photo shop may return a call to client 100 for the service access program in client 100 to submit a request to bank 30 for the transfer of funds to photo shop 40, and upon receiving the call, the client 100 may automatically submit a request to bank server 300 with the security token to obtain this service. However, in the context of FIG. 6, the following description will be made of the services being invoked consecutively by a user's manual operation.

In step S603, the user submits a request to one of the service providers, such as a photo print processing request to be submitted to photo shop server 400. Photo shop 40 is referred to as service provider (i), where i may be equal to 1 of 3 since three (3) service providers were included in the security token request (a further explanation of the numbering will be provided below). The request for the photo printing service includes the security token provided by authentication authority server 200. Upon receiving the request and security token from client 100, photo shop server 400 performs an operation to validate the token (step S604). The validation process will be described in more detail below with regard to FIGS. 8 and 9. It is sufficient to say here, however, that the process performs various operations to restore a session key so as to validate the token. If the token is determined not to be valid (NO in step S605), then the service provider (server 400, in the present example) informs the client that the token is invalid (step S606) and the requested service is not provided. On the other hand, if the token is validated (YES in step S605), the service provider (server 400) provides the requested service (step S607). If the client initiates a request for another service (YES in step S608), then the process returns to step S603 for the next service provider selected by the user (e.g., service provider (i), where i equals 2 for bank 30). On the other hand, if access to another service is not immediately initiated, step S608 may simply wait until access is requested at some later time. If the user closes the service access application without accessing another service, then the process ends at step S609. It should be noted, however, that if the user has not yet accessed all of the service providers that were included in the request and that are included in the security token, if the user initiates the service access program again, if the user requests access to one of the service providers, the process may simply begin again at step S603. In this case, the token may include time-sensitive information such that the token is only valid for a specified time period, and if the time period has expired, the process may then have to return again to step S601 for the user to obtain a new token.

The process of generating the security token (step S602 of FIG. 6) will now be described in more detail with regard to FIGS. 5 and 7. Referring first to FIG. 5, depicted therein are various modules that may form access token module 226 in server 200 to generate the security token. As seen in FIG. 5, the various modules may include secret key module 250, saltbase module 251, salt module 252, session key module 253, presalt module 254, postsalt module 255, blob module 256 and token generating module 257. Secret key module 250 may perform processes to obtain and/or store secret keys of each service provider on the network. Saltbase module may perform processes to generate a base salt (i.e., random number) to be used in the token generation. Salt module 252 may perform various processes to generate a salt corresponding to each respective service provider, where the salt may be generated utilizing the base salt, secret key of the respective service provider and a hashing algorithm. The generation of salts, in general, in the field of cryptography is a known process. Session key module 253 may generate a session key to include the salt of each service provider. Presalt module 254, postsalt module 255 and blob module 256 may perform processes (to be described in more detail below) to generate a presalt, postsalt and blob for each respective service provider, and token generating module 257 may perform processes to generate the security token to include each blob and to provide the token to the client. Each module in FIG. 5 may also perform additional functions to validate the token. That is, if server 200, which generates the security token, also provides a service, then each module of access token module 226 may also perform processes to validate the token when a service is requested from the client. Alternatively, where the access token module is included in a service provider that does not generate the security token but merely validates the token to provide the service, each of the modules may be designed to perform the functions relating to validating the token instead that will be described below with regard to FIGS. 8 and 9.

Figure 7:
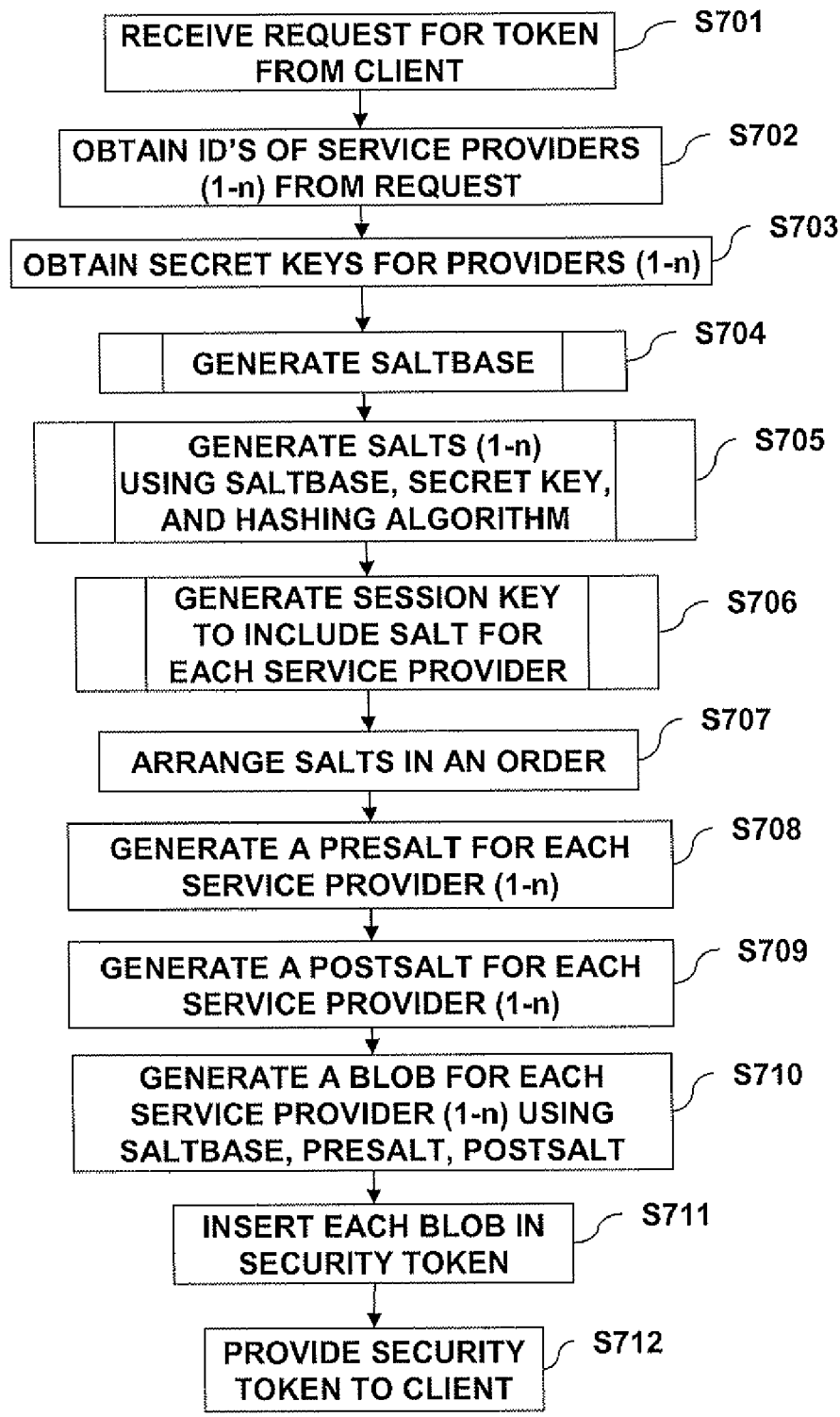
FIG. 7 is a flowchart of process steps of an authentication authority (token provider) generating a security token.

Referring now to FIG. 7, the processes for generating the security token by, for example, authentication authority server 200 will be described. First, in step S701, server 200 receives a request from client 100 for a security token. As described above, the request includes some type of identification data (e.g., a service provider name, an IP address, MAC address, a web address, etc.) that identifies each service provider included in the request. As an example, client 100 submits a request for access to services provided by each of bank server 300, photo shop server 400, print shop server 500 and data storage server 600, and the request includes an address for each of the foregoing servers. Upon receiving the request, the access token module in server 200 obtains the identification data of each service provider server (step S702). As seen in FIG. 7, each service provider is indicated by (1-n), and in the example, bank server 300 may correspond to servicer provider (300), photo shop server 400 may correspond to service provider (400), print shop server 500 may correspond to service provider (400), and data storage server 600 may correspond to service provider (600). In step S703, after having identified the service providers included in the request, the secret key for each of the service providers is obtained (i.e., secret key ($K_{300}$) for server 300, secret key ($K_{400}$) for server 400, secret key ($K_{500}$) for server 500, and secret key ($K_{600}$) for server 600). Steps S702 and S703 may be part of secret key module 251.

In step S704, saltbase module 251 generates a base salt. The base salt may simply be a random number, the length of which (e.g., 32 bits to 256 bits) is dependent upon the level of security desired. The generation of random numbers is a known process and any known process could be used to generate the base salt.

Having generated the base salt, salts for each respective service provider are then generated (i.e., $Salt_{300}$ for server 300, $Salt_{400}$ for server 400, $Salt_{500}$ for server 500 and $Salt_{600}$ for server 600) in step S705 by, for example, salt module 252. In generating each respective salt, the base salt and the respective secret key ($K_i$) are used with a hashing algorithm (H). Thus, in generating each salt, the salt may be generated as: $Salt_i=H(Saltbase+H(K_i))$. Accordingly, each salt in the present example may be defined as follows: $Salt_{300}=H(Saltbase+H(K_{300}))$, $Salt_{400}=H(Saltbase+H(K_{400}))$, $Salt_{500}=H(Saltbase+H(K_{500}))$, and $Salt_{600}=H(Saltbase+H(K_{600}))$.

Once the salts for each service provider are generated, a single session key is generated in step S706 to include the salt for each service provider. The session key may be generated as follows: $SessionKey=H(Salt_1+Salt_2+\ldots+Salt_n)$, where H is a hashing algorithm. Thus, in the present example, the session key would be generated as: $SessionKey=H(Salt_{300}+Salt_{400}+Salt_{500}+Salt_{600})$. This process may be performed by session key module 253.

As part of the invention, the next steps are to generate information that will be used by the service provider to restore the session key and thereby, validate the token. In particular, each salt is arranged in an order (e.g., 1, 2, 3, . . . ) in step S707. Thus, for example, the foregoing salts $Salt_{300}$, $Salt_{400}$, $Salt_{500}$ and $Salt_{600}$ may be assigned in an order of $Salt_1$, $Salt_2$, $Salt_3$, and $Salt_4$. With the assigned order, both a presalt and a postsalt for each service provider can be generated (steps S708 and S709) by presalt module 254 and postsalt module 255, respectively. The presalt contains each of the salts in the arranged order prior to the service provider's salt using the formula: $SaltPre_i=Salt_1|Salt_2|Salt_{i-1}$. Thus, the presalts for each service provider in the example would be as follows: $SaltPre_1=0$, $SaltPre_2=Salt_1$, $SaltPre_3=Salt_1+Salt_2$, and $SaltPre_4=Salt_1+Salt_2+Salt_3$. The postsalt contains each of the salts in the arranged order following the service provider's salt using the formula: $SaltPost_i=Salt_{i+1}+\ldots+Salt_n$. Thus, the postsalts for each service provider in the example would be as follows: $SaltPost_1=Salt_2+Salt_3+Salt_4$, $SaltPost_2=Salt_3+Salt_4$, $SaltPost_3=Salt_4$, and $SaltPost_4=0$.

Once the presalts and postsalts have been generated for each service provider, a blob is generated in step S710 for each respective service provider by blob module 256. A blob is a known term in the art of cryptography. Each respective blob is generated using: $Blob_i=(Saltbase, SaltPre_i, SaltPost_i)$. As additional security, the blob may be encrypted with the secret key ($K_i$) of the respective service provider using: $Blob_i=EK_i(SaltPre_i, SaltPost_i)$. Thus, for the present example, without using the additional secret key encryption, each blob is generated as follows: $Blob_1=(Saltbase, SaltPre_1, SaltPost_1)$, $Blob_2=(Saltbase, SaltPre_2, SaltPost_2)$, $Blob_3=(Saltbase, SaltPre_3, SaltPost_3)$, and $Blob_4=(Saltbase, SaltPre_4, SaltPost_4)$. Each blob is then included in the token in step S711 by token generating module 257.

The token containing each blob is then provided by server 200 to client 100 in step S712. The generated session key is also provided to client 100 in the response as part of step S712. To provide additional security, the response (i.e., session key and token) may be encrypted with a public key of client 100 as part of a public/private keypair, or it may be transmitted over SSL, or any other type of encryption process may be used.

As can be seen from the foregoing, the token includes a blob of information specific for each service provider since it was derived from the secret key of the service provider, and this information is able to be utilized by the service provider to restore (i.e., reverse engineer, so to speak) the session key that was generated by the authentication authority server 200. Thus, while the security token may include the blobs of the other service providers, each service provider is able to derive the session key using its own blob and is not able to utilize the blobs of the other service providers. Of course, if any one service provider server provides multiple different services for which a token has been requested and a blob has been included in the token, that one service provider server would be able to derive the session key (albeit, the same session key) using the blobs for both of the requested services.

Referring back to FIG. 6 for a moment, once the process of step S602 (generating the token) has been performed, the client provides the token to the service provider S603 to request the service, and the service provider performs a process to validate the token (step S604). Here, the service request may be a SOAP request, where the token is included in the SOAP message header. The token in the SOAP header is not encrypted, but the body of the SOAP request may be encrypted by the client using the session key. In this manner, the service provider can obtain the token, restore the session key and then use the restored session key to validate the request. This validation process of step S604 will now be described in more detail with regard to FIGS. 8 and 9.

Figure 8:
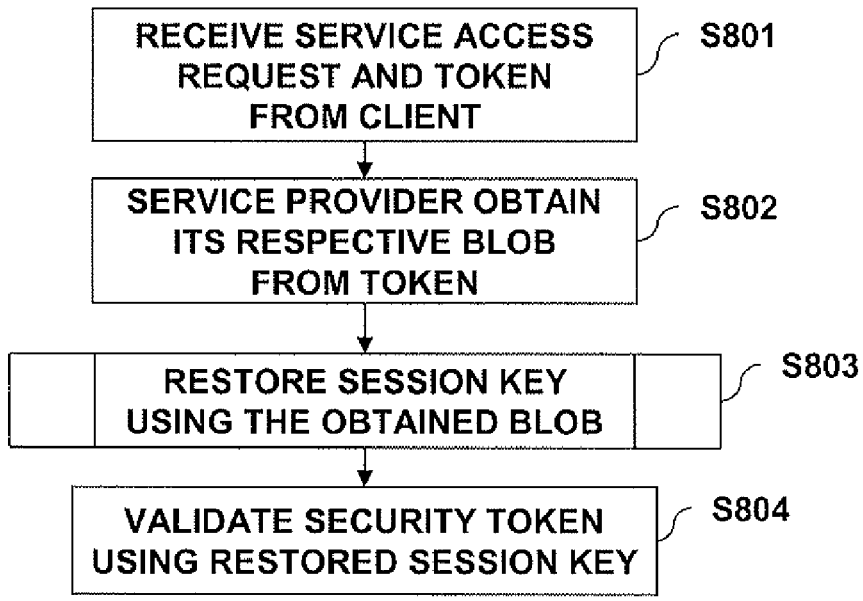
FIG. 8 is a flowchart of process steps of a service provider validating a security token received from a client.

In FIG. 8, the service provider, for example photo shop server 400, receives the service request from client 100 for access to a service provided by photo shop server 400 (step S801). As discussed above, the service access request includes the token generated by authentication authority server 200. Upon receiving the token, the service provider server obtains its respective blob from the token in step S802, which may be performed by blob module 256. In obtaining its respective blob, it is noted that each blob may be associated with the respective service's name (e.g., "service1 name", blob1; "service2 name, blob2). After obtaining its respective blob, in step S803, the service provider server performs a process to restore the session key using the information contained in the obtained blob. This process of step S803 will be described in more detail with regard to FIG. 9

To restore the session key, the saltbase, presalt and postsalt are obtained from the blob in step S901. These can be performed by saltbase module 251, presalt module 254 and postsalt module 255, respectively. Utilizing the saltbase obtained from the blob, and the secret key of the service provider, which is generally maintained by the service provider server itself, the salt for the service provider is then calculated in step S903 by salt module 252. As discussed above, the salt is calculated using: $Salt_i=H(Saltbase+H(K_i))$. Then, in step S904, the session key is restored by session key module 253 by applying a hashing algorithm to i) the salt calculated in step S903, ii) the persalt and iii) the postsalt. As discussed above with regard to step S706, the session key is generated using: $SessionKey=H(Salt_1+Salt_2+\ldots+Salt_n)$, and the combination of the salt, presalt and postsalt results in each of the salts needed to generate the session key. That is, step S903 generated the salt for the service provider in question, while the remaining salts to be included in the session key generation are provided via the presalt and postsalts. Since the presalt includes each of the salts in the arranged order prior to the salt of the service provider in question, and the postsalt includes each of the salts in the arranged order after the salt of the service provider in question, the requisite salts are all accounted for. Thus, the service provider is able to readily regenerate (restore) the session key.

Figure 9:
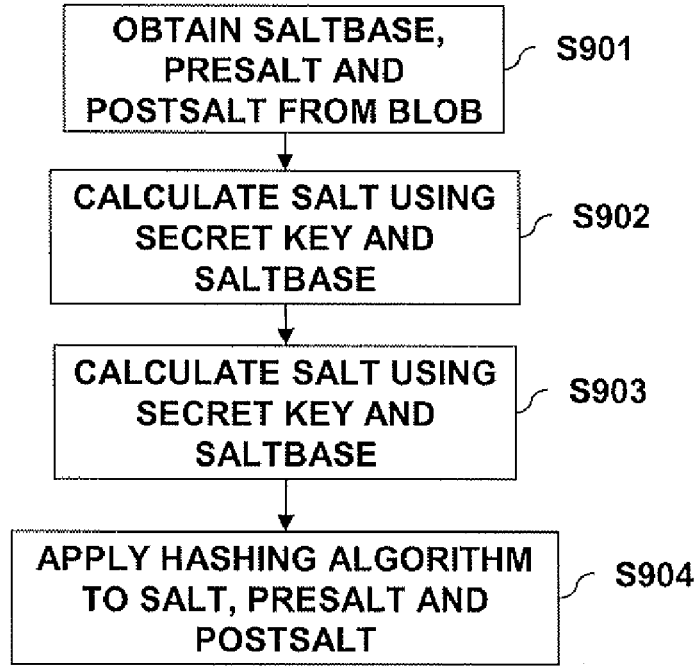
FIG. 9 is a flowchart of process steps for a session key restoration process.

Returning to FIG. 8, after having restored the session key in the process of FIG. 9, in step S804, the token/request is validated using the restored session key. That is, the service provider can then use the restored session key to decrypt the body portion of the service request that was encrypted by the client using the session key. If the service provider is able to successfully decrypt the body of the request, it is determined that the request, and thus the token, is valid. Referring back to FIG. 6 again, after the request/token has been validated in step S605, as discussed above, the service provider server provides the requested service to the client.

As can readily be understood from the foregoing, the claims may be embodied in any one or more of the disclosed devices. Specifically, one or more of the computing devices disclosed herein may be programmed to perform the various processes to request a security token for multiple service providers, generate the requested security token and provide the generated token to the requesting device, submit a service access request for a service to any one or more service providers, where the service access request includes the token, to process the service access request so as to restore the session key and validate the token, and to provide the requested service to the requesting device. Thus, in one aspect, the claims may be embodied in the computing device itself.

Alternatively, the claims may be embodied in a computer program that is recorded on a non-transitory computer-readable storage medium, such as a hard disk drive (HDD), CD-ROM, flash drive, or any other type of computer medium on which computer code can be stored, read-out and executed by a processor in a computer device. In this case, the computer readable medium may embody the claims.

The claims may also be embodied in the process carried out to perform the steps as disclosed. Specifically, the process, in general terms, of submitting a request, generating the token, providing the token, submitting a service request to a service provider, validating the token and providing the service may embody the claims.

While the invention has been described with reference to particular embodiments, it is readily understood that various modifications and changes may be provided without departing from the spirit and scope of the disclosure.

What is claimed is:

1. A method of using a security token generated by an authentication server to access a plurality of service providers in a system that includes the authentication server, the plurality of service providers, and at least one client workstation, the method comprising:
  in a client workstation, specifying a plurality of service providers to be accessed by the client, and submitting a request to an authentication server for a security token to access each of the specified service providers;
  in the authentication server, generating the requested security token by performing the steps of:
    (a) obtaining a secret key for each of the specified service providers;
    (b) generating a saltbase;
    (c) generating a salt for each of the specified service providers, wherein for each service provider, the authentication server generates the respective salt using the saltbase, the secret key of the respective service provider, and a hashing algorithm;
    (d) generating a session key that includes the salt for each service provider;
    (e) assigning an order to each of the generated salts, and arranging the salts in accordance with their respective orders;
    (f) generating a presalt for each of the specified service providers, wherein for each service provider, the authentication server generates the respective presalt using the salt for each service provider previous to the instant service provider, as determined by the respective orders of the salts;
    (g) generating a postsalt for each of the specified service providers, wherein for each service provider, the authentication server generates the respective postsalt using the salt for each service provider following the instant service provider, as determined by the respective orders of the salts;
    (h) generating a blob for each of the specified service providers, wherein for each service provider, the authentication server generates the respective blob using the saltbase, the respective presalt, and the respective postsalt;
    (i) inserting the generated blobs for the specified service providers in the security token; and
    (j) providing the generated security token to the client; and in the client workstation, accessing each of the specified service providers by providing the received security token to each of the specified service providers, wherein each specified service provider validates the received security token, and in response to a determination that the security token is valid, the service provider provides a service to the client.

2. The method of claim 1, wherein each specified service provider validates the received security token by obtaining its respective blob from the security token, restoring its session key using the obtained blob, and validating the security token using its restored session key.

3. The method of claim 2, wherein the service provider restores its session key by obtaining the saltbase, the respective presalt, and the respective postsalt from the obtained blob, calculating the respective salt using the respective secret key and the saltbase, and applying the hashing algorithm to the respective salt, presalt, and postsalt.

4. The method of claim 1, wherein for each service provider, the authentication server generates the respective salt by applying the hashing algorithm to the secret key to generate a hashed secret key, and applying the hashing algorithm to the saltbase and the hashed secret key to generate the respective salt.

5. The method of claim 1, wherein the authentication server generates the session key by applying the hashing algorithm to the salts for each of the specified service providers.

6. The method of claim 1, wherein for each service provider, the respective presalt includes the salts for each service provider previous to the instant service provider, as determined by the respective orders of the salts, and wherein for each service provider, the respective postsalt includes the salts for each service provider following the instant service provider, as determined by the respective orders of the salts.

7. The method of claim 1, wherein the blob for a respective service provider is encrypted using the respective secret key.

8. The method of claim 1, wherein blobs for the specified service providers are included in the generated security token such that they are arranged in accordance with their respective orders.

9. A method for generating a security token that can be used by a plurality of service providers, the method comprising:

in a client workstation, specifying a plurality of service providers to be accessed by the client, and submitting a request to an authentication server for a security token to access each of the specified service providers;

in the authentication server, generating the requested security token by performing the steps of:
obtaining a secret key for each of the specified service providers;
generating a saltbase;
generating a salt for each of the specified service providers, wherein for each service provider, the authentication server generates the respective salt using the saltbase, the secret key of the respective service provider, and a hashing algorithm;
generating a session key that includes the salt for each service provider;
assigning an order to each of the generated salts, and arranging the salts in accordance with their respective orders;
generating a presalt for each of the specified service providers, wherein for each service provider, the authentication server generates the respective presalt using the salt for each service provider previous to the instant service provider, as determined by the respective orders of the salts;
generating a postsalt for each of the specified service providers, wherein for each service provider, the authentication server generates the respective postsalt using the salt for each service provider following the instant service provider, as determined by the respective orders of the salts;
generating a blob for each of the specified service providers, wherein for each service provider, the authentication server generates the respective blob using the saltbase, the respective presalt, and the respective postsalt;
inserting the generated blobs for the specified service providers in the security token; and
providing the generated security token to the client workstation.

10. A system for using a security token to access a plurality of services provided by a plurality of service providers, the system comprising an authentication server, the plurality of service providers, and at least one client workstation, wherein, the client workstation comprises:
a memory storing computer executable process steps and a processor that executes the process steps, the process steps, when executed performing:
specifying a plurality of service providers to be accessed by the client, and
submitting a request to the authentication server for a security token to access each of the specified service providers;

the authentication server comprises:
a memory storing computer executable process steps and a processor that executes the process steps, the process steps, when executed performing:
generating the requested security token by performing the steps of:
(a) obtaining a secret key for each of the specified service providers;
(b) generating a saltbase;
(c) generating a salt for each of the specified service providers, wherein for each service provider, the authentication server generates the respective salt using the saltbase, the secret key of the respective service provider, and a hashing algorithm;
(d) generating a session key that includes the salt for each service provider;
(e) assigning an order to each of the generated salts, and arranging the salts in accordance with their respective orders;
(f) generating a presalt for each of the specified service providers, wherein for each service provider, the authentication server generates the respective presalt using the salt for each service provider previous to the instant service provider, as determined by the respective orders of the salts;
(g) generating a postsalt for each of the specified service providers, wherein for each service provider, the authentication server generates the respective postsalt using the salt for each service provider following the instant service provider, as determined by the respective orders of the salts;
(h) generating a blob for each of the specified service providers, wherein for each service provider, the authentication server generates the respective blob using the saltbase, the respective presalt, and the respective postsalt;
(i) inserting the generated blobs for the specified service providers in the security token; and (j) providing the generated security token to the client; and in the client workstation, further performing:

accessing each of the specified service providers by providing the received security token to each of the specified service providers, wherein each specified service provider validates the received security token, and in response to a determination that the security token is valid, the service provider provides a service to the client.

11. An authentication server in a system that includes the authentication server, a plurality of service providers, and at least one client workstation, comprising:

a non-transitory memory device storing computer executable process steps and a processor that executes the process steps, the process steps, when executed performing a process to generate a security token by:

receiving, from a client workstation, a request for the security token, the request including identification information of a plurality of service providers specified by the client;

obtaining a secret key for each of the specified service providers;

generating a saltbase;

generating a salt for each of the specified service providers, wherein for each service provider, the authentication server generates the respective salt using the saltbase, the secret key of the respective service provider, and a hashing algorithm;

generating a session key that includes the salt for each service provider;

assigning an order to each of the generated salts, and arranging the salts in accordance with their respective orders;

generating a presalt for each of the specified service providers, wherein for each service provider, the authentication server generates the respective presalt using the salt for each service provider previous to the instant service provider, as determined by the respective orders of the salts;

generating a postsalt for each of the specified service providers, wherein for each service provider, the authentication server generates the respective postsalt using the salt for each service provider following the instant service provider, as determined by the respective orders of the salts;

generating a blob for each of the specified service providers, wherein for each service provider, the authentication server generates the respective blob using the saltbase, the respective presalt, and the respective postsalt;

inserting the generated blobs for the specified service providers in the security token; and providing the generated security token to the client workstation, wherein, the client workstation accesses each of the specified service providers by providing the received security token to each of the specified service providers, and wherein each specified service provider restores the session key using its respective blob included in the security token and validates the received security token, and in response to a determination that the security token is valid, the service provider provides a service to the client.

\* \* \* \* \*